US010641386B2

United States Patent
Fujii et al.

(10) Patent No.: US 10,641,386 B2
(45) Date of Patent: May 5, 2020

(54) AUTOMATIC TRANSMISSION CONTROL DECICE

(71) Applicant: JATCO Ltd, Fuji-shi, Shizuoka (JP)

(72) Inventors: Ryosuke Fujii, Atsugi (JP); Hiroaki Shiokawa, Kawasaki (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 15/759,382

(22) PCT Filed: Oct. 21, 2016

(86) PCT No.: PCT/JP2016/081205
§ 371 (c)(1),
(2) Date: Mar. 12, 2018

(87) PCT Pub. No.: WO2017/073464
PCT Pub. Date: May 4, 2017

(65) Prior Publication Data
US 2018/0259065 A1    Sep. 13, 2018

(30) Foreign Application Priority Data
Oct. 28, 2015   (JP) ................... 2015-211369

(51) Int. Cl.
*F16H 61/04*    (2006.01)
*F16H 61/686*   (2006.01)
(Continued)

(52) U.S. Cl.
CPC .......... *F16H 61/0437* (2013.01); *F16H 3/66* (2013.01); *F16H 61/686* (2013.01); *F16H 59/42* (2013.01); *F16H 59/70* (2013.01); *F16H 59/72* (2013.01); *F16H 59/78* (2013.01); *F16H 2061/0411* (2013.01); *F16H 2061/0488* (2013.01);
(Continued)

(58) Field of Classification Search
CPC ..... F16H 2061/0411; F16H 2061/0488; F16H 61/0437; F16H 59/42; F16H 2059/425; F16H 2312/022
See application file for complete search history.

(56) References Cited

U.S. PATENT DOCUMENTS 5,249,483 A * 10/1993 IIzuka ................... F16H 61/061
                                                              477/117
5,303,613 A *  4/1994 Kitagawa ............ F16H 61/0437
                                                              477/98
2006/0190154 A1  8/2006 Kondo et al.

FOREIGN PATENT DOCUMENTS

JP    H06-11026 A    1/1994

* cited by examiner

Primary Examiner — Erin D Bishop
(74) Attorney, Agent, or Firm — Foley & Lardner LLP

(57) ABSTRACT

In an automatic transmission control device of the invention configured to start an increase in engagement pressure of a start-up engagement element, when a determination threshold value for determining that a turbine rotational speed has reduced is reached or exceeded, the determination threshold value when a selection operation from a non-traveling range to a traveling range is made before a prescribed period of time from starting of an engine has elapsed, is increased and set greater than the determination threshold value when the selection operation is made after the prescribed period of time has elapsed. Accordingly, a reduction in the turbine rotational speed can be accurately determined, and thus it is possible to suppress torque fluctuations, occurring owing to engagement of a second brake, which is the start-up engagement element.

4 Claims, 5 Drawing Sheets

(51) Int. Cl.
  *F16H 3/66* (2006.01)
  *F16H 59/42* (2006.01)
  *F16H 59/72* (2006.01)
  *F16H 59/70* (2006.01)
  *F16H 59/78* (2006.01)
(52) U.S. Cl.
  CPC ................ *F16H 2200/0056* (2013.01); *F16H 2200/2012* (2013.01); *F16H 2200/2051* (2013.01); *F16H 2200/2071* (2013.01); *F16H 2200/2087* (2013.01); *F16H 2312/022* (2013.01)

|      | B1  | C1  | C2  | C3  | B5  | B2  | B3  | B4  | F1  | F3  | F2  |
|------|-----|-----|-----|-----|-----|-----|-----|-----|-----|-----|-----|
| 1st  | (O) |     |     | O   | O   | O   |     |     | (O) | (O) | (O) |
| 2nd  |     |     |     | O   | O   | O   | O   |     |     | (O) | (O) |
| 3rd  |     |     | O   |     | O   | O   | O   |     |     | (O) |     |
| 4th  |     |     | O   | O   |     |     |     | O   |     |     |     |
| 5th  |     | O   | O   | O   |     |     |     |     |     |     |     |
| 6th  |     | O   |     | O   |     |     |     | O   |     |     |     |
| 7th  | O   | O   |     | O   |     |     |     |     | (O) |     |     |
| Rev. | O   |     |     | O   |     |     |     | O   |     |     |     |

AUTOMATIC TRANSMISSION CONTROL DECICE

TECHNICAL FIELD

The present invention relates to an automatic transmission, and specifically to an automatic transmission control device that engages an engagement element in connection with a change in a turbine rotational speed.

BACKGROUND ART

In an automatic transmission disclosed in Patent document 1, in determining whether or not engagement of an engagement element starts, the determination is made based on information on whether a turbine rotational speed has reduced by a predetermined rotational speed as compared to the turbine rotational speed at a neutral range (hereinafter referred to as "N range"). And then, when it is determined that an inertia phase has started, an engagement pressure, which is supplied to the engagement element, is increased, and thus a transition to a completely engaged state occurs, thus achieving a smooth shift.

However, even though the inertia phase has not yet been started, there is a case where it is erroneously determined that the turbine rotational speed has reduced. In such a case, when the engagement pressure of the engagement element is increased, the engagement element is abruptly brought into engagement, and thus large torque fluctuations occur. This leads to the problem such as uncomfortable feeling given to the driver.

CITATION LIST

Patent Literature

Patent document 1: Japanese Patent Provisional Publication No. JPH06-11026 (A)

SUMMARY OF INVENTION

It is, therefore, in view of the previously-described drawbacks, an object of the present invention to provide an automatic transmission control device capable of suppressing torque fluctuations by accurately determining a reduction in turbine rotational speed.

In order to accomplish the aforementioned and other objects, according to the present invention, in an automatic transmission control device configured to start an increase in engagement pressure of a start-up engagement element, when a determination threshold value for determining that a turbine rotational speed, which is an automatic transmission input shaft rotational speed, has reduced is reached or exceeded, the determination threshold value when a selection operation from a non-traveling range to a traveling range is made before a prescribed period of time from starting of an engine has elapsed, is increased and set greater than the determination threshold value when the selection operation is made after the prescribed period of time has elapsed.

Accordingly, a reduction in turbine rotational speed can be accurately determined, and thus it is possible to suppress torque fluctuations, occurring owing to engagement of the start-up engagement element.

DESCRIPTION OF EMBODIMENTS

Embodiment 1

Figures 1, 2:
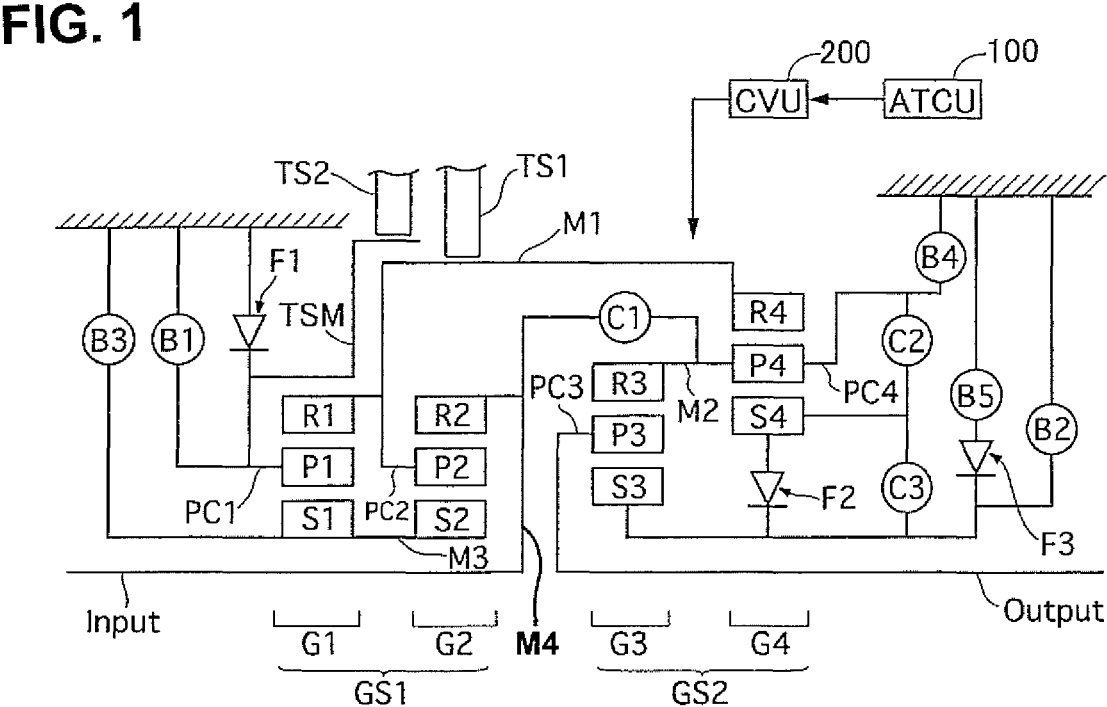
FIG. 1 is a skeleton drawing illustrating the configuration of an FR-type automatic transmission that achieves or provides seven forward speeds and one reverse speed, in a first embodiment.
FIG. 2 is a chart showing an engagement (application) table in respective selector positions of seven forward speeds and one reverse speed in the automatic transmission of the first embodiment.

Referring to FIG. 1, there is shown the skeleton drawing illustrating the configuration of an FR-type automatic transmission that achieves seven forward speeds and one reverse speed, in the first embodiment. The automatic transmission has a controller 100 for inputting various sensor signals and for outputting control signals, and a control valve unit 200 (hereinafter referred to as "CVU") for outputting control hydraulic pressures regulated based on the control signals from the controller 100 (hereinafter referred to as "ATCU") to respective frictional engagement elements. In the automatic transmission, a first planetary gearset GS1 (a first planetary gear G1 and a second planetary gear G2) and a second planetary gearset GS2 (a third planetary gear G3 and a fourth planetary gear G4) are arranged from the side of an input shaft Input to the side of an output shaft Output, in that order. Also arranged or provided as frictional engagement elements are a plurality of clutches C1, C2, and C3, and a plurality of brakes (brake bands) B1, B2, B3, B4, and B5. Also, a plurality of one-way clutches F1, F2, and F3 are arranged.

The first planetary gear G1 is a single pinion type planetary gear having a first sun gear S1, a first ring gear R1, and a first carrier PC1 that supports a first pinion P1 meshed with both of the gears S1 and R1. The second planetary gear G2 is a single pinion type planetary gear having a second sun gear S2, a second ring gear R2, and a second carrier PC2 that supports a second pinion P2 meshed with both of the gears S2 and R2. The third planetary gear G3 is a single pinion type planetary gear having a third sun gear S3, a third ring gear R3, and a third carrier PC3 that supports a third pinion P3 meshed with both of the gears S3 and R3. The fourth planetary gear G4 is a single pinion type planetary gear having a fourth sun gear S4, a fourth ring gear R4, and a fourth carrier PC4 that supports a fourth pinion P4 meshed with both of the gears S4 and R4.

The input shaft Input is connected to the second ring gear R2 via an input rotating member M4, for inputting a rotational driving force from an engine (not shown), which is a driving power source, through a torque converter and the like. The output shaft Output is connected to the third carrier PC3, for outputting or transmitting an output rotational driving force through a final gear and the like to drive road wheels.

A first connecting member M1 is a member that integrally connects the first ring gear R1, the second carrier PC2, and the fourth ring gear R4. A second connecting member M2 is a member that integrally connects the third ring gear R3 and the fourth carrier PC4. A third connecting member M3 is a member that integrally connects the first sun gear S1 and the second sun gear S2.

The first planetary gearset GS1 is constructed by connecting the first planetary gear G1 and the second planetary gear G2 by means of the first connecting member M1 and the third connecting member M3. Also, the second planetary gearset GS2 is constructed by connecting the third planetary gear G3 and the fourth planetary gear G4 by means of the second connecting member M2. The first planetary gearset GS1 has a torque input path (i.e., input rotating member M4) in which torque is inputted from the input shaft Input to the second ring gear R2. Torque, which has been inputted to the first planetary gearset GS1, is outputted from the first connecting member M1 to the second planetary gearset GS2.

The second planetary gearset GS2 has a torque input path in which torque is inputted from the input shaft Input to the second connecting member M2 and a torque input path in which torque is inputted from the first connecting member M1 to the fourth ring gear R4. Torque, which has been inputted to the second planetary gearset GS2, is outputted from the third carrier PC3 to the output shaft Output. By the way, when the third clutch C3 is released and thus the rotational speed of the fourth sun gear S4 is higher than that of the third sun gear S3, the third sun gear S3 and the fourth sun gear S4 individually generate respective rotational speeds. The third planetary gear G3 and the fourth planetary gear G4 are configured to be connected through the second connecting member M2, and hence these planetary gears achieve individual gear ratios.

The first clutch C1 is a clutch for selectively engaging and disengaging the input shaft Input and the second connecting member M2.

The second clutch C2 is a clutch for selectively engaging and disengaging the fourth sun gear S4 and the fourth carrier PC4.

The third clutch C3 is a clutch for selectively engaging and disengaging the third sun gear S3 and the fourth sun gear S4. By the way, the second one-way clutch F2 is located between the third sun gear S3 and the fourth sun gear. A third clutch as recited in the patent claim corresponds to the third clutch C3 of the first embodiment, but the configuration including the second one-way clutch F2 as well as the third clutch may be regarded as a third clutch of the patent claim. The invention is not limited to the particular embodiments shown and described herein.

The first brake B1 is a brake for selectively stopping rotation of the first carrier PC1. Also, the first one-way clutch F1 is arranged in parallel with the first brake B1.

The second brake B2 is a brake for selectively stopping rotation of the third sun gear S3.

The third brake B3 is a brake for selectively stopping rotation of the third connecting member M3.

The fourth brake B4 is a brake for selectively stopping rotation of the fourth carrier PC4.

The fifth brake B5 is a brake arranged in series with the third one-way clutch F3 and also arranged in parallel with the second brake B2, for selectively stopping rotation of the third sun gear S3.

Controller 100 outputs various control signals.

As shown in the engagement table of FIG. 2, a shift hydraulic pressure control device (not shown), which produces engagement pressures (marked with a circle) and release pressures (unmarked) at respective shift stages of seven forward speeds and one reverse speed, is connected to each of clutches C1, C2, C3, and brakes B1, B2, B3, B4, B5. By the way, a hydraulic pressure control type, an electronic control type, or a hydraulic pressure control plus electronic control type may be used as a shift hydraulic pressure control device.

Next, the operation is hereunder explained.

[Shifting Action]

Figure 3:
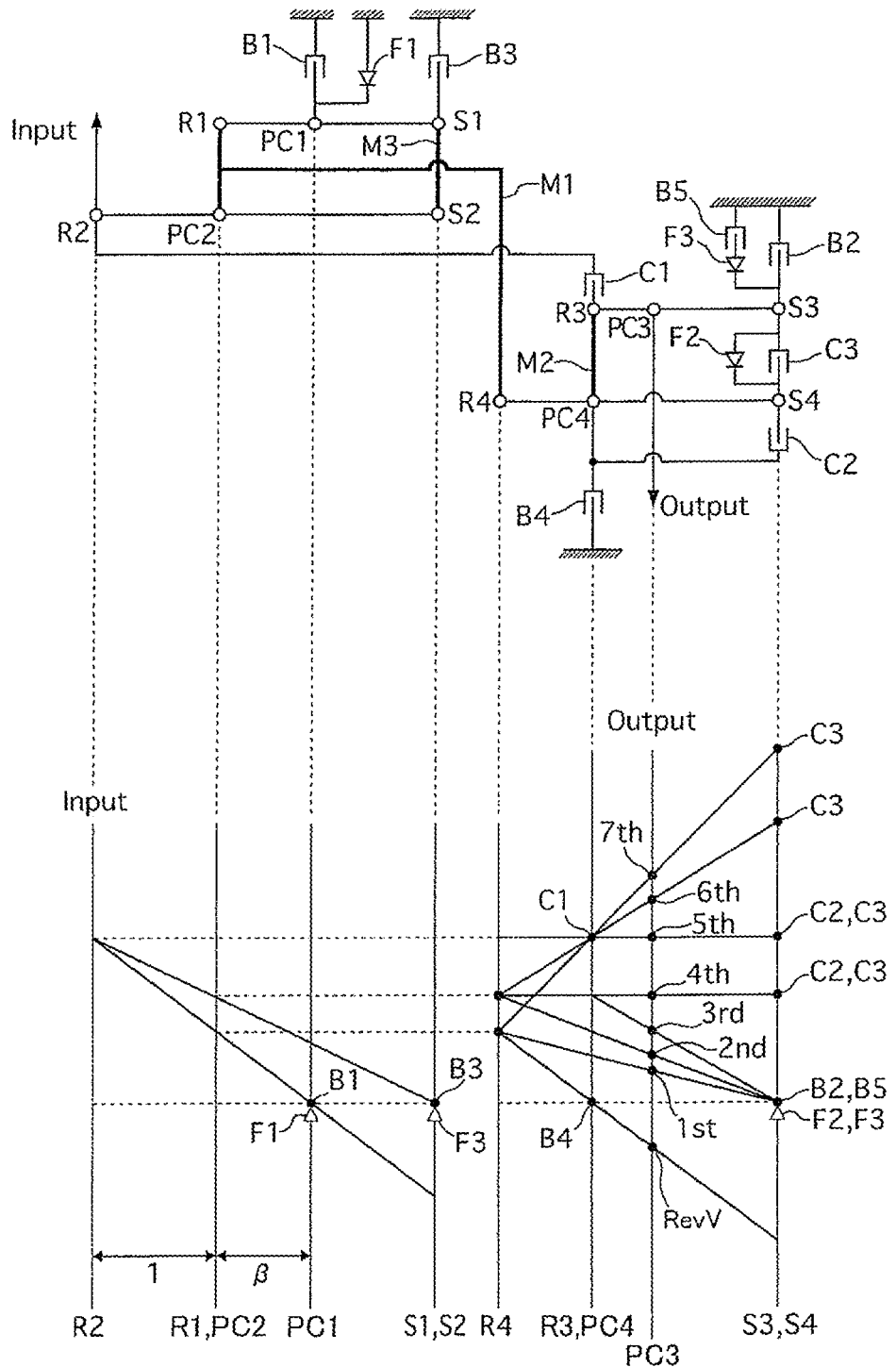
FIG. 3 is an alignment chart (a collinear chart) illustrating a rotation stopped state of each of members at respective shift stages of seven forward speeds and one reverse speed in the automatic transmission of the first embodiment.

FIG. 2 is the chart showing the engagement (application) table in respective selector positions of seven forward speeds and one reverse speed in the automatic transmission of the first embodiment, whereas FIG. 3 is the alignment chart illustrating a rotation stopped state of each of the members at respective shift stages of seven forward speeds and one reverse speed in the automatic transmission of the first embodiment.

<First-Speed>

As shown in FIG. 2, the first-speed gear is obtained by engaging (applying) the second brake B2, the fifth brake B5, and the third clutch C3. The first one-way clutch F1, which is arranged in parallel with the first brake B1, the third one-way clutch F3, which is arranged in series with the fifth brake B5, and the second one-way clutch F2, which is arranged in parallel with the third clutch C3, also contribute to torque transmission. By the way, in an L range, a manual range, or when a vehicle is stopped, an engagement pressure is supplied or applied to the first brake B1. Hereby, an oil leakage within the control valve unit 200 can be suppressed, thereby improving the oil-amount balance and consequently improving fuel economy.

In the first-speed gear, with the first brake B1 applied, rotation, which has been inputted from the input shaft Input to the second ring gear R2, is reduced by the first planetary gearset GS1. The reduced rotation is outputted from the first connecting member M1 to the fourth ring gear R4. Also, the second one-way clutch F2, the third one-way clutch F3, the third clutch C3, and the fifth brake B5, are all engaged (applied), and thus rotation, which has been inputted to the fourth ring gear R4, is outputted from the third carrier PC3, while reduced by the second planetary gearset GS2.

That is, as shown in the alignment chart of FIG. 3, the first-speed gear is specified or defined by the line connecting an engagement point of the first one-way clutch F1 (the first brake B1) that reduces engine output rotation, and an engagement point of the fifth brake B5 (the third one-way clutch F3, the second brake B2) that further reduces the reduced rotation from the first planetary gearset GS1, and, therefore, rotation, which has been inputted from the input shaft Input, is outputted from the output shaft Output, while reduced.

In the case of torque flow in the first-speed gear, torque acts on the first one-way clutch F1 (the first brake B1), the fifth brake B5 (the second brake B2 and the third one-way clutch F3), the third clutch C3, the first connecting member M1, the second connecting member M2, and the third connecting member M3. That is, the first planetary gearset GS1 and the second planetary gearset GS2 contribute to torque transmission.

\<Second-Speed\>

As shown in FIG. 2, the second-speed gear is obtained by engaging (applying) the second brake B2, the third brake B3, the fifth brake B5, and the third clutch C3. By the way, the third one-way clutch F3, which is arranged in series with the fifth brake B5, and the second one-way clutch F2, which is arranged in parallel with the third clutch C3, also contribute to torque transmission.

In the second-speed gear, with the third brake B3 applied, rotation, which has been inputted from the input shaft Input to the second ring gear R2, is reduced by only the second planetary gear G2. The reduced rotation is outputted from the first connecting member M1 to the fourth ring gear R4. Also, the second brake B2 and the third clutch C3 are engaged (applied), and thus rotation, which has been inputted to the fourth ring gear R4, is outputted from the third carrier PC3, while reduced by the second planetary gearset GS2.

That is, as shown in the alignment chart of FIG. 3, the second-speed gear is specified or defined by the line connecting an engagement point of the third brake B3 that reduces engine output rotation and an engagement point of the second brake B2 that further reduces the reduced rotation from the second planetary gear G2, and, therefore, rotation, which has been inputted from the input shaft Input, is outputted from the output shaft Output, while reduced.

In the case of torque flow in the second-speed gear, torque acts on the third brake B3, the second brake B2 (the fifth brake B5 and the third one-way clutch F3), the third clutch C3, the first connecting member M1, the second connecting member M2, and the third connecting member M3. That is, the second planetary gear G2 and the second planetary gearset GS2 contribute to torque transmission.

\<Third-Speed\>

As shown in FIG. 2, the third-speed gear is obtained by engaging (applying) the third brake B3, the second brake B2, the fifth brake B5, and the second clutch C2. By the way, the third one-way clutch F3, which is arranged in series with the fifth brake B5, also contributes to torque transmission.

In the third-speed gear, with the third brake B3 applied, rotation, which has been inputted from the input shaft Input to the second ring gear R2, is reduced by the second planetary gear G2. The reduced rotation is outputted from the first connecting member M1 to the fourth ring gear R4. Also, the second clutch C2 is engaged, and thus the fourth planetary gear G4 rotates together. Furthermore, with the second brake B2 applied, rotation, which has been inputted from the fourth carrier PC4, rotating integrally with the fourth ring gear R4, through the second connecting member M2 to the third ring gear R3, is reduced by the third planetary gear G3, and then the reduced rotation is outputted from the third carrier PC3. In this manner, the fourth planetary gear G4 contributes to torque transmission, but not contribute to speed reduction action.

That is, as shown in the alignment chart of FIG. 3, the third-speed gear is specified or defined by the line connecting an engagement point of the third brake B3 that reduces engine output rotation and an engagement point of the second brake B2 that further reduces the reduced rotation from the second planetary gear G2, and, therefore, rotation, which has been inputted from the input shaft Input, is outputted from the output shaft Output, while reduced.

In the case of torque flow in the third-speed gear, torque acts on the third brake B3, the second brake B2 (the fifth brake B5 and the third one-way clutch F3), the second clutch C2, the first connecting member M1, the second connecting member M2, and the third connecting member M3. That is, the second planetary gear G2 and the second planetary gearset GS2 contribute to torque transmission.

\<Fourth-Speed\>

As shown in FIG. 2, the fourth-speed gear is obtained by engaging (applying) the third brake B3, the second clutch C2, and the third clutch C3.

In the fourth-speed gear, with the third brake B3 applied, rotation, which has been inputted from the input shaft Input to the second ring gear R2, is reduced by only the second planetary gear G2. The reduced rotation is outputted from the first connecting member M1 to the fourth ring gear R4. Also, the second clutch C2 and the third clutch C3 are both engaged, and thus the second planetary gearset GS2 rotates together. Hence, rotation, which has been inputted to the fourth ring gear R4, is outputted directly from the third carrier PC3.

That is, as shown in the alignment chart of FIG. 3, the fourth-speed gear is specified or defined by the line connecting an engagement point of the third brake B3 that reduces engine output rotation and an engagement point of the second clutch C2 and the third clutch C3 that directly output the reduced rotation from the second planetary gear G2, and, therefore, rotation, which has been inputted from the input shaft Input, is outputted from the output shaft Output, while reduced.

In the case of torque flow in the fourth-speed gear, torque acts on the third brake B3, the second clutch C2, the third clutch C3, the first connecting member M1, the second connecting member M2, and the third connecting member M3. That is, the second planetary gear G2 and the second planetary gearset GS2 contribute to torque transmission.

\<Fifth-Speed\>

As shown in FIG. 2, the fifth-speed gear is obtained by engaging the first clutch C1, the second clutch C2, and the third clutch C3.

In the fifth-speed gear, with the first clutch C1 engaged, rotation of the input shaft Input is inputted to the second connecting member M2. Also, the second clutch C2 and the third clutch C3 are both engaged, and thus the third planetary gear G3 rotates together. Hence, rotation of the input shaft Input is outputted directly from the third carrier PC3.

That is, as shown in the alignment chart of FIG. 3, the fifth-speed gear is specified or defined by the line connecting an engagement point of the first clutch C1 that directly outputs engine output rotation and an engagement point of the second clutch C2 and the third clutch C3 that directly output engine output rotation, and, therefore, rotation, which has been inputted from the input shaft Input, is outputted directly from the output shaft Output.

In the case of torque flow in the fifth-speed gear, torque acts on the first clutch C1, the second clutch C2, the third clutch C3, and the second connecting member M2. That is, only the third planetary gear G3 contributes to torque transmission.

\<Sixth-Speed\>

As shown in FIG. 2, the sixth-speed gear is obtained by engaging (applying) the first clutch C1, the third clutch C3, and the third brake B3.

In the sixth-speed gear, with the first clutch C1 engaged, rotation of the input shaft Input is inputted to the second ring gear R2, and also inputted to the second connecting member M2. Also, with the third brake B3 applied, rotation, reduced by the second planetary gear G2, is outputted from the first connecting member M1 to the fourth ring gear R4. Furthermore, with the third clutch C3 engaged, the second planetary gearset GS2 outputs rotation, which is specified or defined by rotation of the fourth ring gear R4 turning and rotation of the second connecting member M2 turning, from the third carrier PC3.

That is, as shown in the alignment chart of FIG. 3, the sixth-speed gear is specified or defined by the line connecting an engagement point of the third brake B3 that reduces engine output rotation by the second planetary gear G2, an engagement point of the first clutch C1 that transmits engine output rotation directly to the second connecting member M2, and an engagement point of the third clutch C3 that constitutes the second planetary gearset GS2, and, therefore, rotation, which has been inputted from the input shaft Input, is outputted from the output shaft Output, while increased.

In the case of torque flow in the sixth-speed gear, torque acts on the first clutch C1, the third clutch C3, the third brake B3, the first connecting member M1, the second connecting member M2, and the third connecting member M3. That is, the second planetary gear G2 and the second planetary gearset GS2 contribute to torque transmission.

<Seventh-Speed>

As shown in FIG. 2, the seventh-speed gear is obtained by engaging (applying) the first clutch C1, the third clutch C3, and the first brake B1 (the first one-way clutch F1).

In the seventh-speed gear, with the first clutch C1 engaged, rotation of the input shaft Input is inputted to the second ring gear R2, and also inputted to the second connecting member M2. Also, with the first brake B1 applied, rotation, reduced by the first planetary gearset GS1, is outputted from the first connecting member M1 to the fourth ring gear R4. Furthermore, with the third clutch C3 engaged, the second planetary gearset GS2 outputs rotation, which is specified or defined by rotation of the fourth ring gear R4 turning and rotation of the second connecting member M2 turning, from the third carrier PC3.

That is, as shown in the alignment chart of FIG. 3, the seventh-speed gear is specified or defined by the line connecting an engagement point of the first brake B1 that reduces engine output speed by the first planetary gearset GS1, an engagement point of the first clutch C1 that transmits engine output rotation directly to the second connecting member M2, and an engagement point of the third clutch C3 that constitutes the second planetary gearset GS2, and, therefore, rotation, which has been inputted from the input shaft Input, is outputted from the output shaft Output, while increased.

In the case of torque flow in the seventh-speed gear, torque acts on the first clutch C1, the third clutch C3, the first brake B1, the first connecting member M1, the second connecting member M2, and the third connecting member M3. That is, the first planetary gearset GS1 and the second planetary gearset GS2 contribute to torque transmission.

<Reverse-Speed>

As shown in FIG. 2, the reverse-speed gear is obtained by engaging (applying) the third clutch C3, the first brake B1, and the fourth brake B4.

In the reverse-speed gear, with the first brake B1 applied, rotation, reduced by the first planetary gearset GS1, is outputted from the first connecting member M1 to the fourth ring gear R4. Also, with the third clutch C3 engaged and the fourth brake B4 applied, the second planetary gearset GS2 outputs rotation, which is specified or defined by rotation of the fourth ring gear R4 turning and the second connecting member M2 held stationary, from the third carrier PC3.

That is, as shown in the alignment chart of FIG. 3, the reverse-speed gear is specified or defined by the line connecting an engagement point of the first brake B1 that reduces engine output speed by the first planetary gearset GS1, an engagement point of the fourth brake B4 that holds the second connecting member M2 stationary, and an engagement point of the third clutch C3 that constitutes the second planetary gearset GS2, and, therefore, rotation, which has been inputted from the input shaft Input, is outputted from the output shaft Output, while reversed and reduced.

In the case of torque flow in the reverse-speed gear, torque acts on the third clutch C3, the first brake B1, the fourth brake B4, the first connecting member M1, the second connecting member M2, and the third connecting member M3. That is, the first planetary gearset GS1 and the second planetary gearset GS2 contribute to torque transmission.

(Layout of Automatic Transmission and Arrangement of Turbine Sensors)

Next, the layout of the automatic transmission and the arrangement of turbine sensors are explained with reference to the skeleton drawing of the first embodiment. As shown in FIG. 1, a detected member TSM for turbine sensor, which serves as a detected member for detecting a rotational speed of the first carrier PC1 by a second turbine sensor TS2, is provided on the first carrier PC1. Also provided on the outer peripheral side of the first connecting member M1 is a first turbine sensor TS1. Also incorporated with the controller ATCU is a rotational-speed calculating section for detecting a rotational speed of the input shaft Input based on rotational speeds of the first turbine sensor TS1 and the second turbine sensor TS2. The reason for using this layout is hereunder explained in detail.

Figure 4:
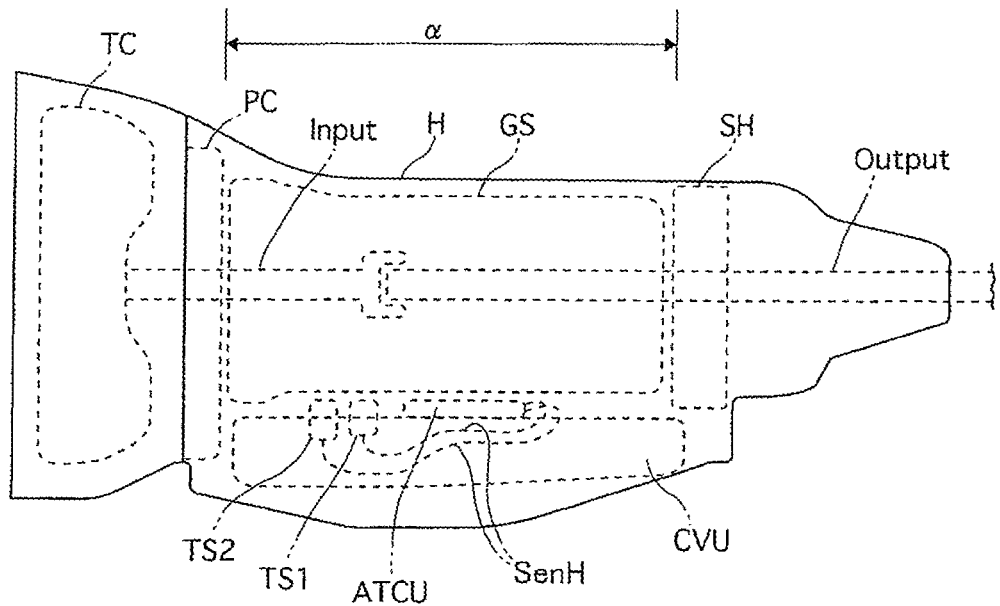
FIG. 4 is a schematic drawing illustrating the layout of the automatic transmission of the first embodiment.

Referring to FIG. 4, there is shown a schematic drawing illustrating the layout of the automatic transmission of the first embodiment. In FIG. 4, "PC" denotes a pump cover, "H" denotes a transmission housing, and "SH" denotes a stator housing. "CVU" denotes the control valve unit, and is arranged on the underside of the planetary gear train G1-G4, for outputting control hydraulic pressures to the plurality of engagement elements (C1-C3, B1-B5). "ATCU" denotes the controller, and is arranged between the planetary gear train G1-G4 and the control valve unit CVU. With the previously-noted configuration, the automatic transmission of the first embodiment is configured as a mechanically and electrically integrated type automatic transmission. With regard to the first planetary gear G1 and the second planetary gear G2, the first ring gear R1 and the second carrier PC2 are connected to each other, while the first sun gear S1 and the second sun gear S2 are connected to each other. That is, these two planetary gears constitute a planetary gearset by respectively connecting two rotating elements.

In the automatic transmission of the first embodiment, a rotational speed of the input shaft Input and a rotational speed of the output shaft Output are both detected, and thus a gear ratio during a shifting process can be accurately grasped, thereby improving the quality of shift control of the automatic transmission, based on hydraulic pressure control and the like. For the purpose of optimum gear ratio characteristics, as shown in FIG. 1, the automatic transmission of the first embodiment is comprised of four planetary gears G1-G4. The input shaft Input is introduced from the left-hand side in FIG. 1, and connected between the first planetary gear G1 and the second planetary gear G2. The first connecting member M1, which connects the second carrier PC2 and the fourth ring gear R4, is configured to extend from the left-hand side of the second planetary gear G2 toward the outer diameter side of the second planetary gear G2, and further extend through the outer diameter side of the second planetary gear G2 and the third planetary gear G3 to the left-hand side of the fourth planetary gear G4. That is, the input shaft Input is covered from the outer diameter side by the first connecting member M1, and the second planetary gear G2 and the third planetary gear G3 are also covered from the outer diameter side by the first connecting member M1.

In this automatic transmission, there is a problem how to arrange the turbine sensors that detect an input shaft rotational speed. As shown in the schematic drawing illustrating the layout of FIG. 4, the input shaft Input, which is connected to a torque converter TC, is introduced through the pump cover PC into the planetary gearsets GS (G1-G4). Rotation of the introduced input shaft Input is appropriately speed-changed by means of the planetary gearsets GS (G1-G4), and thereafter the speed-changed rotation is outputted from the output shaft Output through the stator housing SH. Also arranged on the underside of the planetary gearsets GS (G1-G4) is the control valve unit CVU for crating various control hydraulic pressures. The controller for controlling the automatic transmission is mounted between the control valve unit CVU and the planetary gearsets GS. In such a mechanically and electrically integrated type automatic transmission, for the purpose of facilitating the connection between the sensor harnesses SenH of turbine sensors TS1, TS2 and the controller ATCU, it is desirable to arrange the turbine sensors on the outer diameter side of a region a sandwiched between the pump cover PC and the stator housing SH, thereby ensuring the harness connection ease.

However, the input shaft Input exits in the center of the automatic transmission. Also, the rotating members, (rotating elements) which have the same rotational speed as the input shaft Input, are covered with the above-mentioned first connecting member M1 from the outer diameter side. Hence, it is impossible to directly detect the rotational speed of the input shaft Input by the turbine sensors. Also, the first and second sun gears S1, S2 are rotating elements configured to be held stationary by means of the third brake B3, and inevitably it is necessary to ensure a route such that these sun gears can be connected to the transmission housing H.

In this case, the following tasks (problems) occur.

Task 1: The third connecting member M3, which connects the first and second sun gears S1 and S2, is configured to rotate on the inner diameter side of the first and second planetary gears, and thus routing to the outer diameter side is not easy.

Task 2: For instance, it is also contemplated to insert the turbine sensors from the side of pump cover PC in the axial direction, but the pump cover PC serves to support the input shaft Input and also serves as a reaction-force receiving element for other engagement elements (e.g., the first brake B1 and the second brake B2), and thus it is not preferable to form a through hole for the sensors in the pump cover from the point of view of a mechanical strength.

Task 3: Furthermore, the side of torque converter TC is a drying chamber that does not require lubrication, while the side, on which the planetary gearsets GS are housed, is a moist chamber that requires lubrication, and thus it is necessary to further install a special seal for the through hole. This leads to the problem such as an increase in the number of component parts.

Task 4: Moreover, assuming that, in the mechanically and electrically integrated configuration, the first turbine sensor TS1 and the second turbine sensor TS2 are spaced apart from each other, this leads to the problem such as a deterioration in harness routing, and consequently to a deterioration in assembly workability.

Hence, the rotational speed of the input shaft Input is detected by calculation executed within the rotational-speed calculating section incorporated in the ATCU through the use of two turbine sensors TS1, TS2, while paying attention to the configuration in which the input shaft Input is connected to the second ring gear R2, and the first planetary gear G1 and the second planetary gear G2 constitute the planetary gearset by respectively connecting two rotating elements. The input-shaft rotational speed, detected by calculation, is hereinafter referred to as "calculated turbine rotational speed Nt". Concretely, assuming that the rotational speed of the first carrier PC1 is denoted by N(PC1), the rotational speed of the second carrier PC2 is denoted by N(PC2), the rotational speed of the second ring gear R2 is denoted by Nt, as shown in the alignment chart of FIG. 3 the gear ratio of the second ring gear R2 and the second carrier PC2 (the first ring gear R1) is set as "1", and the gear ratio of the first ring gear R1 (the second carrier PC2) and the first carrier PC1 is set as "β", the calculated turbine rotational speed Nt can be calculated by the following expression.

$$Nt=(1+1/\beta)N(PC2)-(1/\beta)N(PC1)$$

The first turbine sensor TS1 detects the rotational speed of the second carrier PC2, while the second turbine sensor TS2 detects the rotational speed of the detected member TSM for turbine sensor (see FIG. 1), which member is connected to the first carrier PC1. Accordingly, the calculated turbine rotational speed Nt can be calculated by the above-mentioned expression.

Figure 5:
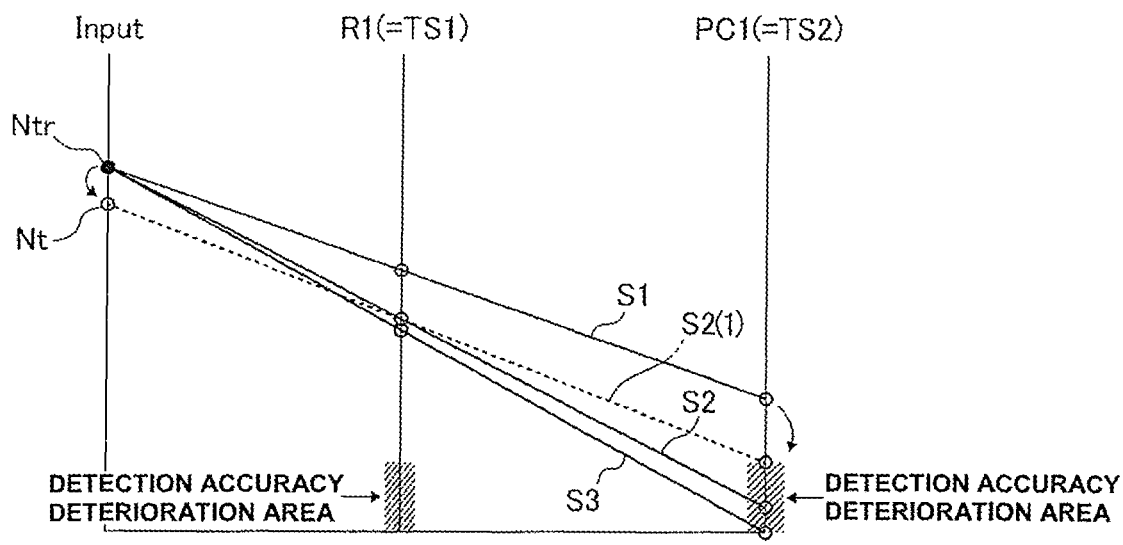
FIG. 5 is a common velocity diagram illustrating the relationship among respective rotating elements immediately after starting of the engine in the first embodiment.

Referring to FIG. 5, there is shown the common velocity diagram illustrating the relationship among respective rotating elements immediately after starting the engine in the first embodiment. Assuming that an actual turbine rotational speed, which is a real rotational speed of the turbine, is denoted by Ntr, the respective rotating elements are easy to co-rotate when the oil temperature is low immediately after the engine has started. Thus, the respective rotating elements have the collinear relationship shown by "S1" in FIG. 5. At this time, the detected rotational speeds correspond to rotational speeds such that both of the first turbine sensor TS1 and the second turbine sensor TS2 can detect the respective rotational speeds with high detection accuracy. As a result of this, the calculated turbine rotational speed Nt becomes identical to the actual turbine rotational speed Ntr.

Thereafter, when engagement (application) of the first brake B1 starts for the purpose of improving the oil-amount balance, the rotational speed of the first carrier PC1 begins to reduce, and finally reaches the collinear relationship shown by "S3" in FIG. 5. In the process of transition from "S1" to "S3", when the rotational speed of the first carrier PC1 reaches a detection accuracy deterioration area in which the resolution of the second turbine sensor TS2 reduces, there is a possibility of erroneous determination such that the rotational speed of the first carrier PC1 stagnates at the upper end of the detection accuracy deterioration area, even if the actual rotational speed of the first carrier PC1 reduces in the collinear relationship shown by "S2" in FIG. 5. This is because each of the turbine sensors is configured to detect the rotation period of concave and convex portions, and thus, during low rotation, it takes a long time until the next convex portion or the next concave portion arrives and consequently it takes a long time until the rotational speed is updated. In that case, as shown by "S2(1)" indicated by the dotted line in FIG. 5, the calculated turbine rotational speed Nt is calculated based on the rotational speed detected by the first turbine sensor TS1 whose detection accuracy is high and the rotational speed detected by the second turbine sensor TS2 whose detection accuracy deteriorates. Thus, the calculated turbine rotational speed Nt is more apt to be calculated as a speed value lower than the actual turbine rotational speed Ntr. In that case, due to a momentary decrease in the calculated turbine rotational speed Nt obtained by such arithmetic operation, there is a possibility of erroneous determination such that the actual turbine speed Ntr itself has decreased.

Hereinafter explained in detail is the background of engagement control of the second brake B2 corresponding to a start-up clutch. For instance, when switching from an N range to a D range occurs, a play elimination of the second brake B2 is made by pre-charging operation, and then shelf pressure, which is lower than a pressure value of complete engagement, is set. Thereafter, when an inertia phase starts and then it is determined that the calculated turbine rotational speed Nt has reduced, the engagement pressure is increased at a gradient according to a degree of the reduction in the calculated turbine rotational speed Nt, and thus a transition to a completely engaged state occurs. At this time, suppose that the engagement pressure is increased responsively to a sudden change in the calculated turbine rotational speed Nt even in a state where the actual turbine rotational speed Ntr does not yet change. In that case, the actual turbine rotational speed Ntr will be forcibly reduced, and thus there is a possibility that large torque fluctuations are undesirably transmitted to the drive road wheel side. Also, owing to the engagement pressure increase at a comparatively large gradient, the inertia torque tends to increase, thereby causing undesirable torque fluctuations. Furthermore, when the oil temperature is low, an engine starting period idle speed tends to be set comparatively high, thereby causing larger torque fluctuations. Therefore, in the first embodiment, the control device is configured to avoid a change in the calculated turbine rotational speed Nt from being recognized as a reduction in the actual turbine rotational speed for a prescribed period of time, at very low temperatures immediately after starting of the engine. Hence, it is possible to suppress large torque fluctuations.

Figure 6:
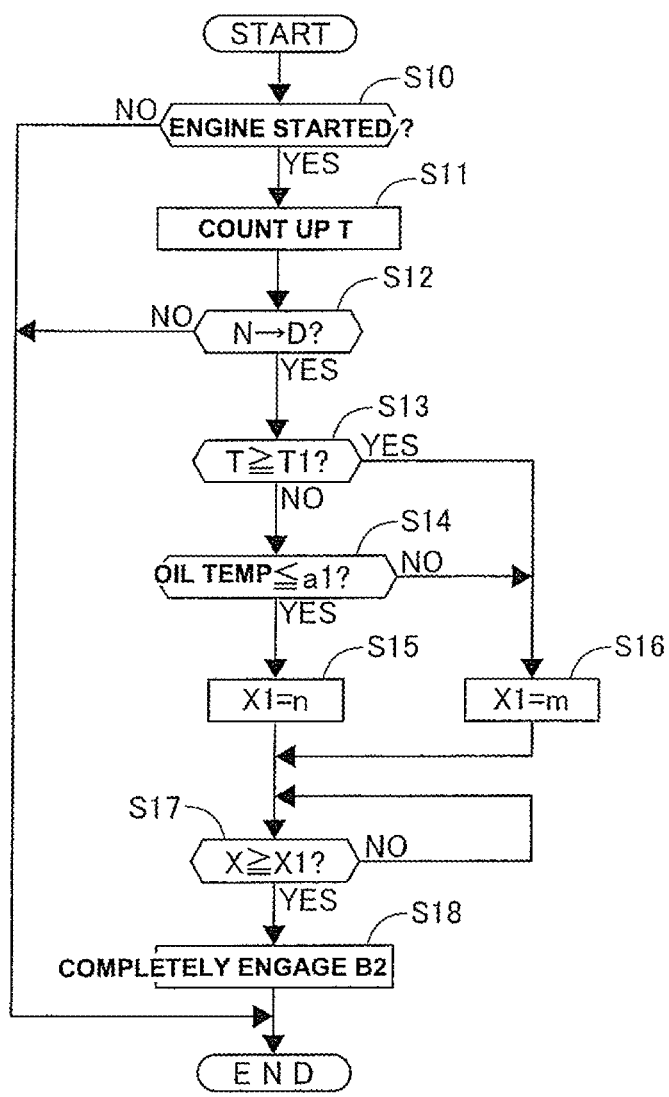
FIG. 6 is a flowchart illustrating turbine rotational speed reduction determination processing in the first embodiment.

Referring to FIG. 6, there is shown the flowchart illustrating turbine rotational speed reduction determination processing in the first embodiment.

At step S10, a check is made to determine whether or not the engine has been started. When the engine has been started, the routine proceeds to step S11. Otherwise, this routine (the control flow) terminates.

At step S11, a timer T is counted up and started.

At step S12, a check is made to determine whether or not a range selection from an N range to a D range has been made. When the range selection has been made, the routine proceeds to step S13. Otherwise, the control flow terminates. By the way, the above-mentioned range selection is not limited to only the ND range selection, but the control flow may be applied to another range selection, for example, a selection from a non-power-transmission range such as a P range or the like to a power-transmission range.

At step S13, a check is made to determine whether the count value of timer T is greater than or equal to a prescribed period of time T1. When the count value is greater than or equal to the prescribed period of time T1, the routine proceeds to step S16. Conversely when the count value is less than the prescribed period of time T1, the routine proceeds to step S14. By the way, the above-mentioned prescribed period of time T1 is a time period considered as a reliable completion of engagement of the first brake B1. This is because, if the first brake B1 has completely engaged (applied), a sudden change in the calculated turbine rotational speed Nt does not occur.

At step S14, a check is made to determine whether the oil temperature is less than or equal to a prescribed oil temperature a1 representing a very low temperature. When the oil temperature is less than or equal to the prescribed oil temperature, the routine proceeds to step S15. Otherwise, the routine proceeds to step S16.

At step S15, a threshold value for a reduction count value when the turbine rotational speed has been determined to have reduced, that is, a reduction determination threshold value X1 for determining that a reduction in the turbine rotational speed certainly occurs is set to "n".

At step S16, the reduction determination threshold value X1 is set to "m". By the way, "m" and "n" are integers such that m<n. That is, before the prescribed period of time from a selection from an N range to a D range has elapsed, in order to avoid erroneous determination, the reduction determination threshold value is set comparatively larger. In contrast, after the prescribed period of time has elapsed, the reduction determination threshold value is set comparatively smaller, because of a less possibility of erroneous determination, thereby enabling quick engagement control.

At step S17, a check is made to determine whether a reduction count value X of the calculated turbine rotational speed Nt is greater than or equal to the reduction determination threshold value X1. When the reduction count value X is greater than or equal to the reduction determination threshold value X1, the routine proceeds to step S18. Otherwise, this step S17 is repeatedly executed. By the way, the reduction count value X is counted up, only when the turbine rotational speed is continuously reducing. When an increase in the calculated turbine rotational speed Nt occurs during counted-up operation, the reduction count value is reset. Hence, a state where the turbine rotational speed reduces can be detected with high accuracy.

At step S18, it is determined that the calculated turbine rotational speed Nt begins to certainly reduce and thus an inertia phase starts, and then a transition to a completely engaged state of the second brake B2 occurs.

Figure 7:
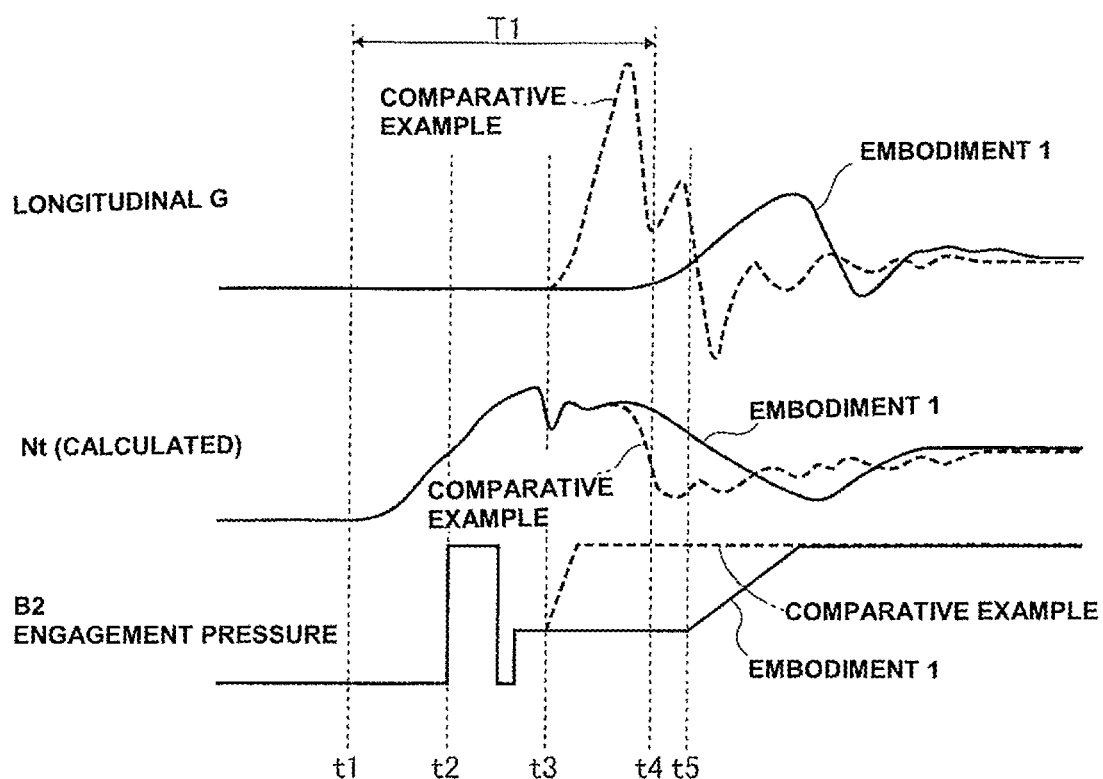
FIG. 7 is a time chart when an N-D selection (ND range selection) has been made immediately after starting of the engine.

Referring to FIG. 7, there is shown the time chart when an N-D selection (ND range selection) has been made immediately after starting of the engine. By the way, at the initial stage, the vehicle is in a very low temperature state, the engine is in a stopped state, and also the vehicle is in a stopped state. In FIG. 7, the dotted line shows a comparative example in which turbine rotational speed reduction determination processing is not executed, whereas the solid line shows the first embodiment in which turbine rotational speed reduction determination processing is executed.

At the time t1, an ignition switch is turned ON by the driver, for starting up the engine. By virtue of cranking of the starter motor, the engine speed begins to increase, and thus the calculated turbine rotational speed Nt begins to increase.

At the time t2, when a selector lever is operated by the driver so as to perform a selection operation from an N range to a D range, pre-charging operation of the second brake B2 starts.

In the case of the comparative example, at the time t3, immediately when a reduction in the calculated turbine rotational speed Nt is detected, this reduction is erroneously recognized as starting of the inertia phase, and thus the engagement pressure begins to rise at a stretch, and then torque is transmitted to the drive road wheels at a stretch. Thus, there is a possibility that, owing to a longitudinal acceleration (longitudinal G) increasing at a stretch, uncomfortable feeling is given to the driver.

In contrast to the above, in the first embodiment, when the driver operates the selector lever from an N range to a D range in a state where a prescribed period of time T1 from starting of the engine has not yet elapsed, a comparison check is made, using the reduction determination threshold value X1 (X1=n). Hence, even when a reduction in the calculated turbine rotational speed Nt occurs at the time t3, the engagement pressure supply to the second brake B2 is not started, since the reduction count value X does not yet exceed the reduction determination threshold value X1 (X1=n).

At the time t5 after the prescribed period of time T1 from starting of the engine has elapsed at the time t4, immediately when the reduction count value X exceeds the reduction determination threshold value X1 (X1=n) and thus a reduction in the calculated turbine rotational speed Nt has been certainly detected, the engagement pressure is gradually increased according to a degree of the reduction in the calculated turbine rotational speed Nt. Hereby, the calculated turbine rotational speed Nt gradually reduces, and thus a sudden change in the longitudinal G is effectively suppressed. Hence, the longitudinal G changes smoothly, and it is possible to avoid uncomfortable feeling given to the driver.

As discussed above, the first embodiment provides the following operation and effects.

(1) In an automatic transmission control device configured to start an increase in engagement pressure of a second brake B2 (a start-up engagement element) when a count value X of an event that a calculated turbine rotational speed Nt (an automatic transmission input shaft rotational speed) has been determined to have reduced is greater than or equal to a reduction determination threshold value X1 (a determination threshold value), the reduction determination threshold value X1 when a selection operation from an N range (a non-traveling range) to a D range (a traveling range) is made before a prescribed period of time T1 from starting of an engine has elapsed, is increased and set greater than the reduction determination threshold value when the selection operation is made after the prescribed period of time has elapsed. Concretely, the reduction determination threshold value X1 is changed from "m" to "n".

Accordingly, a reduction in the calculated turbine rotational speed Nt can be accurately determined, and thus it is possible to suppress torque fluctuations, occurring owing to engagement of the second brake B2.

(2) The reduction determination threshold value X1 when an oil temperature during a starting period of the engine is less than a prescribed oil temperature a1 is increased and set greater than the reduction determination threshold value when the oil temperature is greater than or equal to the prescribed oil temperature. Concretely, the reduction determination threshold value X1 is changed from "m" to "n".

That is to say, when the oil temperature is very low, an engine idle speed is set high. Thus, assuming that, due to erroneous determination, the second brake B2 is brought into engagement (application), there is an increased tendency for a large start-up shock to occur. As a countermeasure against this problem, when the oil temperature is less than the prescribed oil temperature a1, the reduction determination threshold value X1 is changed to a larger value "n", and thus it is possible to accurately determine a reduction in the turbine rotational speed, thereby avoiding a start-up shock.

(3) When the count value of a sequence of events that the calculated turbine rotational speed Nt has been determined to have reduced is greater than or equal to the reduction determination threshold value X1, the increase in engagement pressure of the second brake B2 is started.

Therefore, a reduction state of the calculated turbine rotational speed Nt can be accurately detected.

(4) The automatic transmission control device is equipped with a first turbine sensor TS1 (a first rotation sensor) that detects a rotational speed of a first connecting member M1, and a second turbine sensor TS2 (a second rotation sensor) that detects a rotational speed of a first carrier PC1 (a rotating element of a planetary gearset), the first carrier having the rotational speed different from the first connecting member M1, and the calculated turbine rotational speed Nt is calculated based on the rotational speed detected by the first turbine sensor TS1 and the rotational speed detected by the second turbine sensor TS2.

Therefore, even if it is impossible to directly detect the rotational speed of the input shaft Input by the turbine sensors, the calculated turbine rotational speed Nt can be detected. Furthermore, it is possible to achieve high-precision speed reduction determination processing for the calculated turbine rotational speed Nt by avoiding an undesirable situation where an erroneous turbine rotational speed is undesirably calculated within the detection accuracy deterioration area of each of the sensors.

While the foregoing is a description of the preferred embodiments carried out the invention, it will be understood that the invention is not limited to the particular embodiments shown and described herein, but the inventive concept may be applied to an automatic transmission having another configuration. For instance, in the first embodiment, the invention has been applied to a seven forward speeds and one reverse speed automatic transmission. In lieu thereof, the invention may be applied to an automatic transmission having another type of skeleton, an automatic transmission with further multiple shift stages, or an automatic transmission with less number of shift stages. In the shown embodiment, as a determination threshold value, the prescribed reduction count value (the prescribed number of times) of an event that the calculated turbine rotational speed Nt has been determined to have reduced is used. Instead of using this, speed reduction determination processing may be performed based on a reduction amount (a rate of reduction) in the calculated turbine rotational speed Nt, for instance. In this case, by setting a prescribed reduction amount such that the prescribed reduction amount or more cannot occur even in the presence of erroneous detection as a determination threshold value, it is possible to accurately determine a reduction in the calculated turbine rotational speed Nt.

The invention claimed is:

1. An automatic transmission control device, comprising: a controller configured to start an increase in engagement pressure of a start-up engagement element when a reduction count value, which increases when an input shaft rotational speed of an automatic transmission is reduced, reaches or exceeds a determination threshold value, wherein when a selection operation from a non-traveling range to a traveling range is made and before a prescribed period of time from starting of an engine has elapsed, the determination threshold value when the selection operation is made before the prescribed period of time has elapsed is set greater than the determination threshold value when the selection operation is made after the prescribed period of time has elapsed.

2. The automatic transmission control device as recited in claim 1, wherein:

the determination threshold value when the selection operation is made before the prescribed period of time has elapsed and when an oil temperature during a starting period of the engine is less than a prescribed oil temperature is set greater than the determination threshold value when the selection operation is made after the prescribed period of time has elapsed and when the oil temperature is greater than or equal to the prescribed oil temperature.

3. The automatic transmission control device as recited in claim 1, wherein:

the reduction count value corresponds to a number of times when the reduction of the input shaft rotational speed is continued.

4. The automatic transmission control device as recited in claim 1, further comprising:

a planetary gear train having a first planetary gearset, a second planetary gearset, a third planetary gearset, and a fourth planetary gearset arranged from a side of an input shaft to a side of an output shaft, in order of the first planetary gearset, the second planetary gearset, the third planetary gearset and the fourth planetary gearset;

an input rotating member configured to extend toward an outer diameter side from the input shaft and connected to a ring gear of the second planetary gearset between the second planetary gearset and the third planetary gearset;

a first connector connected at one end to a carrier of the second planetary gearset between the first planetary gearset and the second planetary gearset, and at another end to a ring gear of the fourth planetary gearset, and configured to cover an outer diameter side of the second planetary gearset and the third planetary gearset;

a planetary gearset provided by connecting respective two rotating elements of the first planetary gearset and the second planetary gearset;

a plurality of engagement elements that determine a gear ratio of the planetary gear train;

a first rotation sensor configured to detect a rotational speed of the first connector; and a second rotation sensor configured to detect a rotational speed of a rotating element of the planetary gearset, the rotational speed of the rotating element being different from the rotational speed of the first connector, wherein the controller is configured to calculate the input shaft rotational speed based on the rotational speed detected by the first rotation sensor and the rotational speed detected by the second rotation sensor.

* * * * *